US008640152B2

(12) United States Patent
Roh et al.

(10) Patent No.: US 8,640,152 B2
(45) Date of Patent: Jan. 28, 2014

(54) OPTICAL DEVICE

(75) Inventors: Min Shik Roh, Seoul (KR); Hyun woo Lee, Suwon-si (KR); Min Song, Hwaseong-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/339,471

(22) Filed: Dec. 29, 2011

(65) Prior Publication Data

US 2012/0174135 A1  Jul. 5, 2012

(30) Foreign Application Priority Data

Dec. 31, 2010  (KR) .................. 10-2010-0140714

(51) Int. Cl.
*G11B 7/00* (2006.01)
(52) U.S. Cl.
USPC ........................................... 720/692

(58) Field of Classification Search
USPC ........................................... 720/692
See application file for complete search history.

(56) References Cited

U.S. PATENT DOCUMENTS

| 6,259,667 | B1 * | 7/2001 | Huang et al. | 720/616 |
| 6,854,124 | B2 * | 2/2005 | Shimizu et al. | 720/606 |
| 6,968,558 | B2 * | 11/2005 | Lee et al. | 720/600 |
| 7,020,884 | B2 * | 3/2006 | Choi et al. | 720/613 |
| 7,310,804 | B2 * | 12/2007 | Bae | 720/616 |
| 7,596,794 | B2 * | 9/2009 | Guo | 720/613 |
| 7,627,874 | B2 * | 12/2009 | Kobayashi et al. | 720/607 |
| 2008/0189728 | A1 * | 8/2008 | Kobayashi et al. | 720/692 |

* cited by examiner

*Primary Examiner* — Mark Blouin
(74) *Attorney, Agent, or Firm* — NSIP Law

(57) ABSTRACT

An optical device is provided including a tray body linearly moving and loading an optical disk. A case guide is configured to guide the linear movement of the tray body. A damper is interposed between the tray body and the case guide to attenuate vibration of the tray body.

19 Claims, 3 Drawing Sheets

OPTICAL DEVICE

CROSS REFERENCE TO RELATED APPLICATION

Pursuant to 35 U.S.C. §119 (a), this application claims the benefit of earlier filing date and right of priority to Korean Patent Application No. 10-2010-0140714, filed on Dec. 31, 2010. The subject matter of the earlier filed application is hereby incorporated by reference.

BACKGROUND

1. Field

The following description generally related to an optical device configured to absorb vibration generated during rotation of an optical disk.

2. Description of the Related Art

In general, an optical disk refers to CD (Compact Disc)-ROM, CD-R, CE-RW, DVD (Digital Versatile Disc)-ROM, DVD-R, DVD-RW, and a recently-developed format of AVCHD, HD-DVD, and a Blu-ray Disc® using a bluish-violet laser light capable of higher density recording than the above optical discs, such as BD-R and BD-RE.

Data is recorded or reproduced on the optical disk by an optical pickup including a laser diode as a light emitting source, a photo diode as a light receiving source, a diffraction grating forming a light path between the light emitting source and the light receiving source, a sensor lens, a mirror, and an objective lens.

In the objective lens of the optical pickup, a focusing servo control is performed on a perpendicular direction of the optical disk, and a tracking servo control is performed on a circumferential direction of the optical disk. In the optical pickup, a track is traced, along a track formed along a circumferential direction of the optical disk, to input and output an optical signal corresponding to a pitch shape of a particular track.

The optical disk placed on a tray is loaded on or unloaded from an optical device, and rotated by a spindle motor. The optical pickup is connected to a feed motor to linearly move to a radial direction of the optical disk along a guide rod. The spindle motor includes a stator wound with a coil and fixed to a bracket, and a rotor mounted with a magnet generating an electromagnetic force by interacting with the stator.

SUMMARY

The present disclosure has been made to provide an optical device configured to absorb horizontal vibration and vertical vibration of a tray generated during rotation of an optical device.

Technical subjects to be solved by the present disclosure are not restricted to the above-mentioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

In order to achieve at least the above objects, in whole or in part, and in accordance with the purposes of the disclosure, as embodied and broadly described, and in one general aspect of the present invention, there is provided an optical device, including a tray body configured to linearly move and load an optical disk. The optical device also includes a case guide configured to guide the linear movement of the tray body. The optical device includes a damper configured to be interposed between the tray body and the case guide to attenuate vibration of the tray body.

In accordance with an aspect, there is provided an optical device, including a tray body configured to load an optical disk. The optical device includes a spindle motor configured to be directly connected to the tray body, and a case configured to movably accommodate the tray body. The optical device further includes a damper configured to be inserted into a connected position between the tray body and the case to attenuate vibration.

In accordance with an aspect, there is provided an optical device, including a tray body configured to be directly connected to a spindle motor. The optical device further includes a case configured to be movably accommodating the tray body. The optical device includes a case guide configured to be provided at the case to guide a linear movement of the tray body. The optical device includes a damper configured to be formed of a viscoelastic material and interposed between the tray body and the case guide or between the tray body and the case.

In accordance with an aspect, there is provided an optical device, including a tray body configured to load an optical disk, and a spindle motor configured to be directly connected to the tray body. The optical device further includes a damper configured to absorb vibration, wherein the vibration is excited by the spindle motor and transmitted from the tray body, at a connected portion of the tray body.

In accordance with an aspect, there is provided an optical device, including a tray body configured to linearly move and load an optical disk, and a case guide configured to guide the linear movement of the tray body. The optical device also includes an anti-vibration device comprising a side connected to an anti-vibration fixture provided at a distal end of the case guide, and another side brought into contact with a contactor protruded at a bottom of the tray body to attenuate vibration of the tray body.

The optical device according to the present disclosure has an advantageous effect in that horizontal vibration and vertical vibration of a tray generated during rotation of an optical device can be absorbed.

BRIEF DESCRIPTION OF THE DRAWINGS

The accompanying drawings, which are included to provide a further understanding of the disclosure and are incorporated in and constitute a part of this application, illustrate example(s) of the disclosure, and together with the description serve to explain the principle of the disclosure. In the drawings.

DETAILED DESCRIPTION

Figure 1:
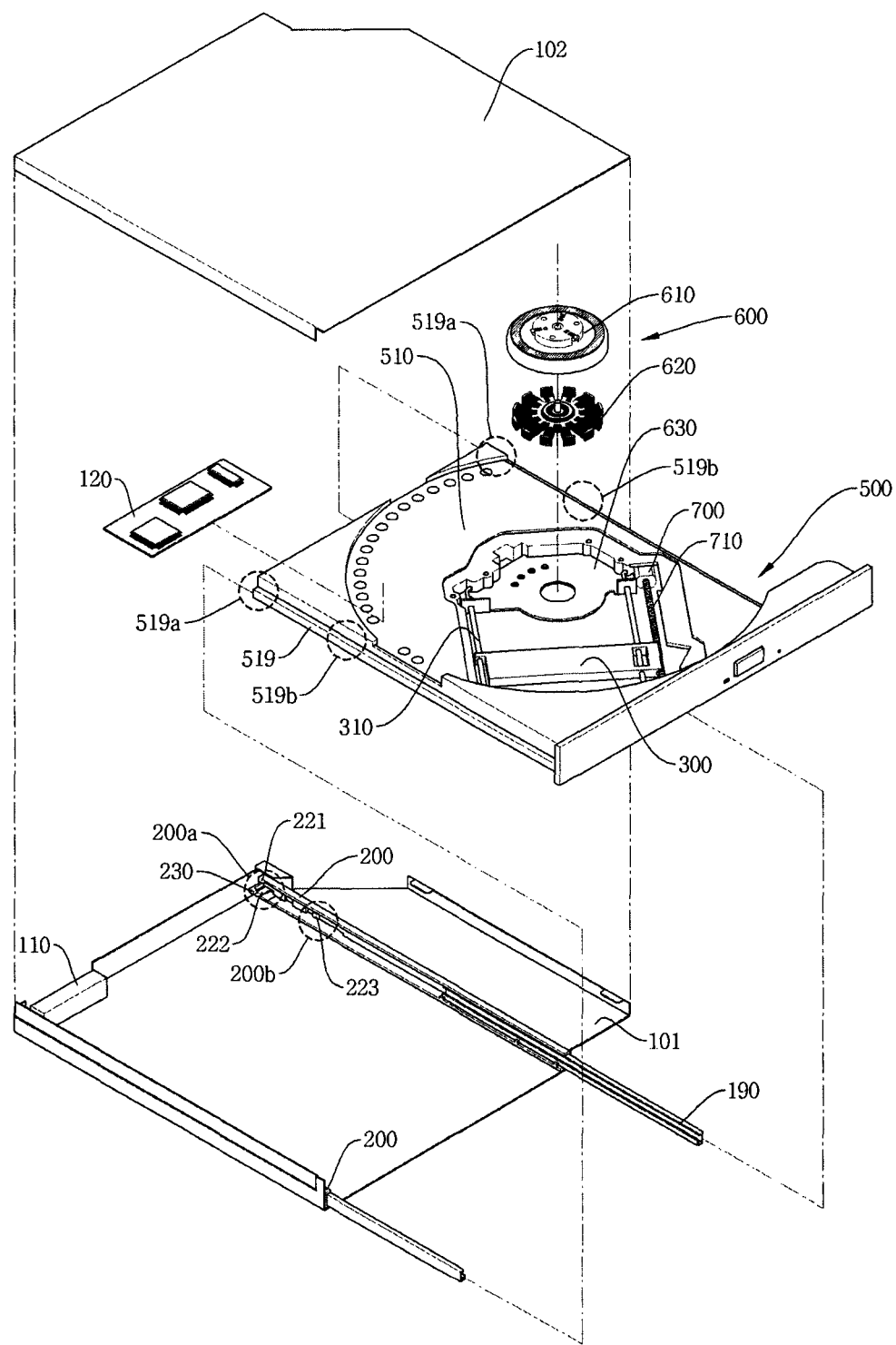
FIG. 1 is an exploded perspective view illustrating an optical device in an anti-vibration device, according to an illustrative example.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

It will be understood that when an element or layer is referred to as being "on," "connected to" or "coupled to" another element or layer, it can be directly on, operatively connected or coupled, or connected or coupled to the other element or layer or intervening elements or layers. In contrast, when an element is referred to as being "directly on," "directly connected to" or "directly coupled to" another element or layer, there are no intervening elements or layers present. Like numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. As may be used herein, the terms "substantially" and "approximately" provide an industry-accepted tolerance for its corresponding term and/or relativity between items.

Descriptions of well-known components and processing techniques are omitted so as to not unnecessarily obscure the various configurations of the disclosure. In the drawings, the size and relative sizes of components and regions may be exaggerated for clarity.

Hereinafter, an optical device according to various configurations will be described in detail with reference to the accompanying drawings.

Figure 2:
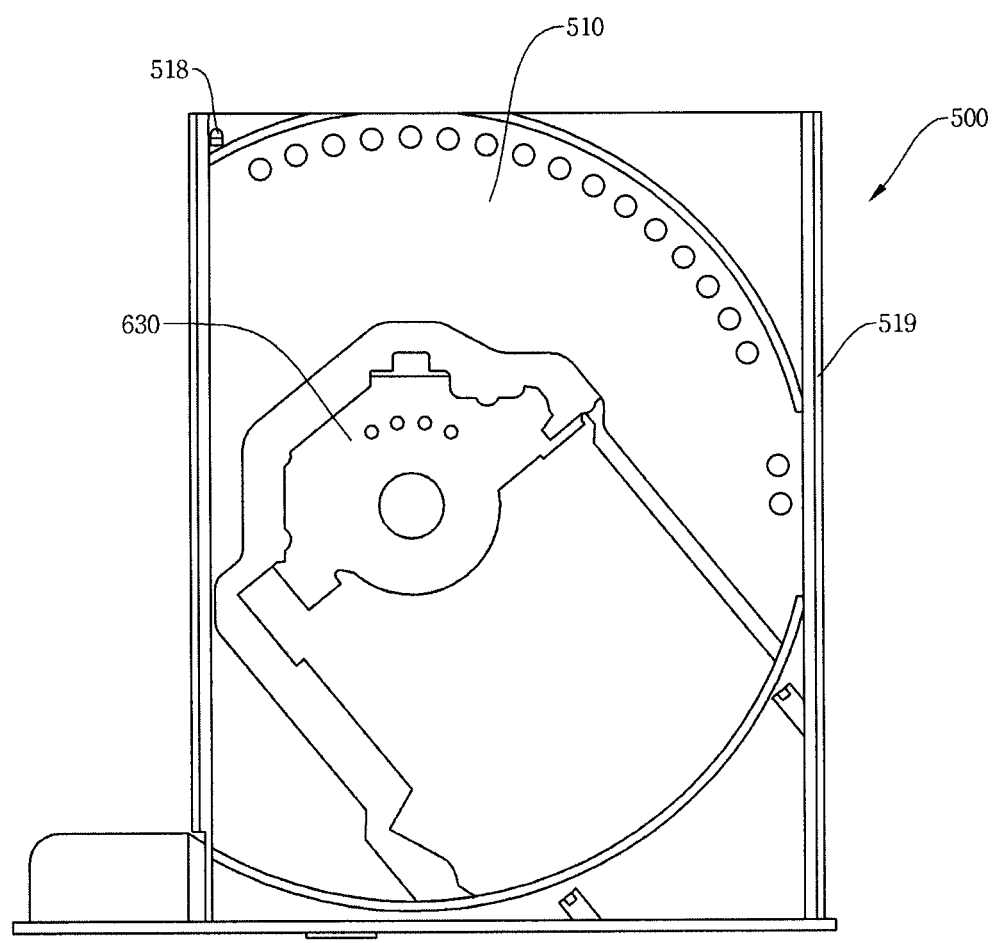
FIG. 2 is a rear view of a tray body showing a damper contactor, according to an illustrative example.
Figure 3:
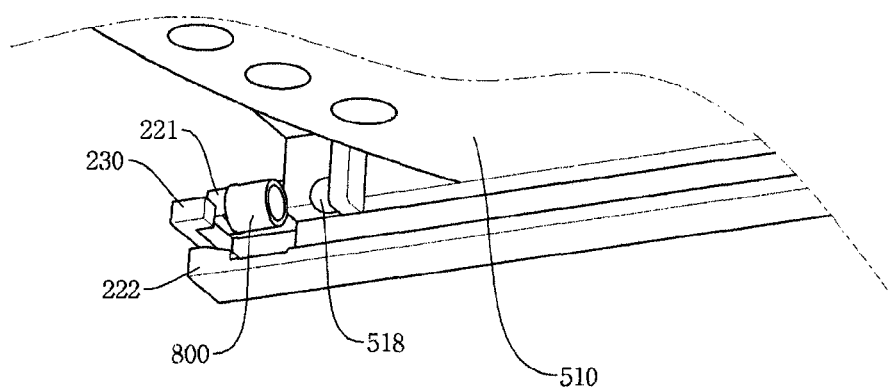
FIG. 3 is a partial perspective view illustrating a damper, according to an illustrative example.
Figure 4:
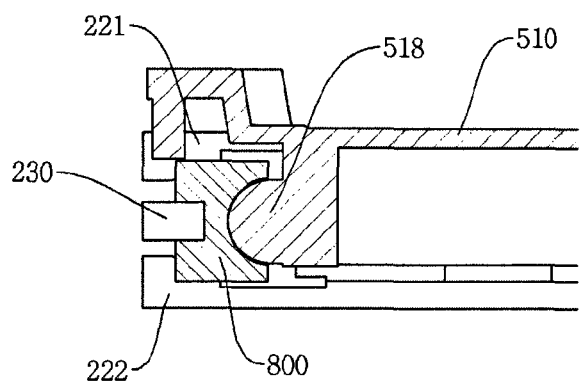
FIG. 4 is a lateral cross-sectional view of FIG. 3.
Figure 5:
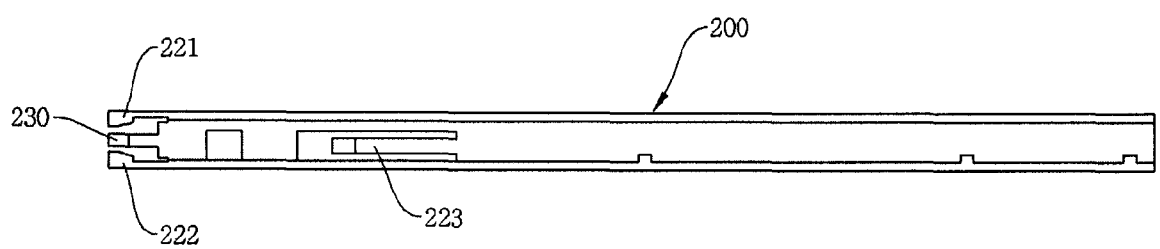
FIG. 5 is a lateral view illustrating a shape of a case guide, according to an illustrative example.

FIG. 1 is an exploded perspective view illustrating an optical device in an anti-vibration device, according to an illustrative example. FIG. 2 is a rear view of a tray body showing a damper contactor, according to an illustrative example. FIG. 3 is a partial perspective view illustrating a damper, according to an illustrative example. FIG. 4 is a lateral cross-sectional view of FIG. 3. FIG. 5 is a lateral view illustrating a shape of a case guide, according to an illustrative example.

Referring to FIGS. 1 to 5, an optical device includes an upper case (102), a bottom case (101), a main PCB (Printed Circuit Board, 120), a tray unit (500), a spindle motor (600), a feed motor (700) and a case guide (200).

The bottom case (101) is connected to a notebook computer or other multimedia devices, and is provided with an interface connector (110). The interface connector (110) is connected to the main PCB (120). The bottom case (101) is provided with the case guide (200) guiding a sliding of the tray unit (500) and is also provided with an intermediate guide (190) connected to the case guide (200). The upper case (102) is fastened to the bottom case (101) to tightly seal the optical device.

In the present disclosure, in one example, the term of 'case' refers to any one of the upper case (102) and the bottom case (101), or refers to an assembly of the upper case (102) and the bottom case (101). Furthermore, the term 'connected portion between a tray body (510) and case' collectively refers to a connected portion between the tray body (510) and the bottom case (101), a connected portion between the tray body (510) and the upper case (102), and a connected portion between an assembly of the bottom case (101) and the upper case (102) and the tray body (510).

The spindle motor (600) includes a stator (620) wound with a coil and a rotor (610) generating an electromagnetic force by interacting with the stator (620). The stator (620) may be fixed by being inserted into a bracket (630) or by bonding method, whereby the spindle motor (600) is secured to the bracket (630).

An optical pickup (300), reading an optical signal reflected from an optical reflective surface of an optical disk, is guided in linear movement thereof along with at least one or more guide rod (310), and receives a driving force through the feed motor (700) and a lead screw (710). According to FIG. 1, a guide rod (310) is respectively provided at each of left and right sides of the optical pickup (300).

The main PCB (120) includes therein a motor driving chip controlling drive of the spindle motor (600) and the feed motor (700), an optical pickup controller controlling operation of the optical pickup (300) and signal input/output, a Serial Advanced Technology Attachment (SATA) interface controller, and a circuit controlling other operations of the optical device. In some illustrative examples, the main PCB (120) may be mounted at a bottom surface of the tray body (510) to move along with the tray body (510).

Both distal ends of the tray body (510) may be protrusively formed with a tray guide (519). The tray guide (519) may be inserted into the intermediate guide (190) or the case guide (200) to guide the movement of the tray body (510).

The tray unit (500) may include the tray body (510) placed with the optical disk and the bracket (630). In illustrative example, the bracket (630) and the tray body (510) may be integrally formed.

In some illustrative examples, when the bracket (630) and the tray body (510) are provided with different materials, the materials including, but not limited to, plastic, resin, polyurethane materials, or aluminum, the bracket (630) may be directly connected to the tray body (510), and the stator (620) of the spindle motor (600) may be secured to the bracket (630) integrally formed with the tray body (510).

In some examples, the bracket (630) and the tray body (510) provided with different materials may be manufactured by an insert molding method. In the insert molding method, a synthetic resin material would form the tray body (510), which would be completely and integrally formed with part of the bracket (630) to omit a fastening member and to obtain a rigid coherence.

In some illustrative examples, the guide rod (310) guiding the linear movement of the optical pickup (300) may be directly connected to the tray body (510), where the guide rod (310) and the tray body (510) are integrally formed. Furthermore, the feed motor (700), which is a driving source linearly moving the optical pickup (300), and the feed motor (700) may be directly connected to the tray body (510), so the feed motor (700) and the tray body (510) are integrally formed.

In a structure where the bracket (630) may be directly connected to the tray body (510), as in an exemplary illustrative example, a vibration generated from a rotation of the spindle motor (600) is not absorbed, and is directly transmitted to the connected portion of the tray body (510), along with the case guide (200), the upper case (102), and the bottom case (101).

Thus, in accordance with an illustrative example, an anti-vibration device is provided between the case guide (200) and the tray guide (519), between the upper case (102) and the tray body (510), and between the bottom case (101) and the tray body (510). In a case the anti-vibration device is provided between the upper case (102) and the tray body (510) or between the bottom case (101) and the tray body (510), the configuration of the anti-vibration device may be modified taking a sliding of the tray body (510) into consideration.

Therefore, in the present configuration, taking into consideration a sliding of the tray body (510), an anti-vibration device as a vibration transmitting medium may be arranged at a portion adjacent to the tray guide (519) and corresponding to a connection portion of the tray body (510) to reduce volume of the anti-vibration device and to simplify the structure of the anti-vibration device. In order for the vibration transmitting medium, that is the connection portion of the tray body (510), to absorb the vibration, the anti-vibration device, according to an illustrative example, may be mounted at the case guide (200) opposite to the tray guide (519).

In some exemplary illustrations, as shown in FIGS. 3 and 4, the anti-vibration device may include a damper (800) installed between the tray body (510) and the case guide (200). One side of the damper (800) is connected to a damper fixture (230) provided at a distal end (200a) of the case guide (200), and the other side of the damper (800) is brought into contact with a damper contactor (518) protruded at a bottom of the tray body (510).

In some exemplary configurations, the damper (800) may be provided with a rubber-like viscoelastic material to mainly absorb a vibration of the tray body (510) using a viscoelasticity attenuating action. In some illustrative examples, the damper contactor (518) may be selectively brought into contact with the damper (800) in response to the linear movement of the tray body (510) such that the damper contactor (518) takes a hemispherical shape for a smooth contact and separation. The hemispherical shape is a shape adequate enough to transmit vibration in all directions, rather than concentrating the vibrations to any one direction of x axis, y axis, and z axis. However, a person of ordinary skill in the art will appreciate that a similar geometrical shape may be used to achieve the intended result of transmitting the vibration in all directions, rather than in a concentrated manner in a particular direction.

In some exemplary configurations, the damper fixture (230) and the damper (518) may be press-fitted or bonded, where the damper (518) may be structurally prevented from being disengaged from the damper fixture (230) by contact force of the damper contactor (518).

In some exemplary configurations, one side of the damper (800), opposite to the damper contactor (518), and another side of the damper (800) contacting the damper contactor (230) may take a partially cut-out shape, where an exterior of the damper (800) may take a free shape.

In some exemplary configurations, as shown in FIG. 1, for instance, the damper fixture (230) may be formed at the distal end (200a) of the case guide (200) and may be interposed between a first suspension (221) and a second suspension (222). In alternative configurations, the damper fixture (230) may be mounted at any connected portion of the tray body (510) including the case guide (200), the upper case (102) and the bottom case (101). Other similar variations of the configuration of the damper fixture (230) may be achieved without departing from the intended scope.

In some illustrative examples, in addition to the damper (800), the anti-vibration device includes a first suspension (221) provided at the case guide (200), a second suspension (222), and a third suspension (223). The first suspension (221), the second suspension (222), and the third suspension (223) correspond to at least one portion of the case guide (200). Furthermore, shapes of one or more of the first suspension (221), the second suspension (222), and the third suspension (223) may vary accordingly to accommodate to the shape of the case guide (200).

In some examples, the first suspension (221), the second suspension (222) and the third suspension (223) may be made of same material as that of the case guide (200) to absorb vibration of the tray body (510), using at least part of the elasticity of the case guide (200).

In some exemplary configurations, a rotation of the optical disk starts from a position where the tray body (510) is completely inserted into the bottom case (101), which is a loading position of the optical disk. An installation position of the anti-vibration device is so arranged as to smoothly perform the vibration absorbing function at the loading position. That is, the anti-vibration device may be arranged at a rear portion (519a) of the tray guide (519) or a center portion (519b) of the tray guide (519).

In some exemplary configurations, the first suspension (221) and the second suspension (222) may vertically face each other across the tray guide (519). The first suspension (221) and the second suspension (222) may elastically apply pressure to distal upper and bottom surfaces of the tray guide (519) to absorb vibration in a vertical direction when the tray body (510) is completely inserted into an end of the loading position.

In some examples, the third suspension (223) elastically applies pressure to a lateral surface of the tray guide (519) to absorb vibration of lateral direction. Each tray guide (519) is provided at a left side and a right side of the tray body (510), and each case guide (200) is provided at a left side and a right side of the bottom case (101) relative to the tray guide (519).

In some illustrative examples, the anti-vibration device may be provided at each case guide (200), where vertical and lateral vibrations of the tray body (510) are absorbed by elastic deformation of the first, second, and third suspensions (221, 222, 223), or absorbed by viscoelasticity attenuation of damper.

In some exemplary configurations, the first suspension (221), the second suspension (222) and the third suspension (223) may be configured to have a cantilever shape, each having a fixing end connected to the case guide (200), and each having a free end elastically brought into contact with the tray guide (519). In some illustrative examples, the first suspension may be configured to have a shape downwardly protruding the distal end (200a) of the case guide (200). The second suspension may be configured to have a shape upwardly protruding the distal end (200a) of the case guide (200). The third suspension may be configured to have a shape laterally protruding the center portion (200b) of the case guide (200).

In some exemplary configurations, the first suspension (221) and the second suspension (222) may absorb the vibration of the tray guide (519) at a loading position of the tray body (510) to be brought into contact with the rear portion (519a) of the tray body (510). The third suspension (223) may absorb the lateral vibration of the tray body (510) at the loading position of the tray body (510) to be brought into contact with the center portion (519b) of the tray body (510).

The anti-vibration device, according to the present disclosure, has, at least, the advantageous effect of having a reduced number of parts and a reduced number of assembling processes because a part of the case guide (200) itself is utilized.

The optical device according to the present disclosure, has, at least, an advantageous effect of having the vibration of the tray body, which is a vibration transmitting medium, absorbed by the tray body and a connected portion of other parts in a structure, where a spindle motor and an optical pickup are directly connected to the tray body. As a result, an anti-vibration device including a damper may have a small occupying space and may obtain an anti-vibrating effect. Furthermore, a part of a case guide may be utilized as a part of the anti-vibration device to reduce the number of parts and the number of assembling processes.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical device, comprising:
   a tray body configured to linearly move and load an optical disk;
   a case guide configured to guide the linear movement of the tray body; and
   a damper configured to receive therein a damper contactor protruding from the tray body, and to be interposed between the tray body and the case guide to attenuate vibration of the tray body,
   wherein one side of the damper is fixed to a distal end of the case guide and another side of the damper is brought into contact with the tray body.

2. The optical device of claim 1, wherein one side of the damper is connected to a damper fixture formed at the distal end of the case guide and another side of the damper is brought into contact with the damper contactor.

3. The optical device of claim 2, wherein the damper is press-fitted or bonded to the damper fixture.

4. The optical device of claim 2, wherein one or more of the one side of the damper facing the damper fixture and the other side of the damper contacting the damper contactor comprise a partially cut-out shape.

5. The optical device of claim 1, wherein one side of the damper is brought into contact with the case guide and another side of the damper is brought into contact with the damper contactor, and wherein the damper contactor comprises a hemispherical shape to transmit vibration from all directions to the damper.

6. The optical device of claim 1, further comprising:
   one or more of a first suspension, a second suspension, and a third suspension configured to absorb vibration of the tray body using elasticity of the case guide.

7. The optical device of claim 1, further comprising:
   one or more of a first suspension and a second suspension formed by protruding a distal end of the case guide, and a third suspension formed by protruding a center portion of the case guide.

8. The optical device of claim 1, wherein the case guide is provided with a first suspension, a second suspension, and a third suspension, wherein the first and second suspensions elastically apply pressure to the distal end of the case guide, and the third suspension elastically apply pressure to a center portion of the case guide.

9. The optical device of claim 1, wherein the damper is provided with a viscoelastic material.

10. An optical device, comprising:
    a tray body configured to load an optical disk;
    a spindle motor configured to be directly connected to the tray body;
    a case configured to movably accommodate the tray body; and
    a damper configured to receive therein a damper contactor protruding from the tray body, and be inserted into a connected position between the tray body and the case to attenuate vibration,
    wherein one side of the damper is fixed to a distal end of the case guide and another side of the damper is brought into contact with the tray body.

11. The optical device of claim 10, wherein the damper contactor is inserted into an interior of the other side of the damper to transmit vibration acting to all directions to the damper.

12. An optical device, comprising:
    a tray body configured to be directly connected to a spindle motor;
    a case configured to be movably accommodating the tray body;
    a case guide configured to be provided at the case to guide a linear movement of the tray body; and
    a damper configured to receive therein a damper contactor protruding from the tray body, and be formed of a viscoelastic material and interposed between the tray body and the case guide or between the tray body and the case,
    wherein one side of the damper is fixed to a distal end of the case guide and another side of the damper is brought into contact with the tray body.

13. The optical device of claim 12, further comprising:
    one or more of a first suspension, a second suspension, and a third suspension, each configured to be of a cantilever shape and provided at the case guide, wherein the one or more of the first suspension, the second suspension, and the third suspension each comprises a fixing end connected to the case guide, and a free end elastically brought into contact with the tray guide.

14. An optical device, comprising:
    a tray body configured to load an optical disk;
    a spindle motor configured to be directly connected to the tray body; and
    a damper configured to receive therein a damper contactor protruding from the tray body, and absorb vibration, wherein the vibration is excited by the spindle motor and transmitted from the tray body, at a connected portion of the tray body,
    wherein one side of the damper is fixed to a distal end of the case guide and another side of the damper is brought into contact with the tray body.

15. The optical device of claim 14, further comprising:
one or more of a first suspension, a second suspension, and a third suspension, each provided at the connected portion of the tray body in a cantilever shape configured to absorb the vibration by elastic deformation.

16. An optical device, comprising:
a tray body configured to linearly move and load an optical disk;
a case guide configured to guide the linear movement of the tray body; and
an anti-vibration device comprising a side connected to an anti-vibration fixture provided at a distal end of the case guide, and another side configured to receive therein a contactor protruded at a bottom of the tray body to attenuate vibration of the tray body.

17. The optical device of claim 16, wherein the contactor is selectively brought into contact with the anti-vibration device in response to the linear movement of the tray body so that the contactor takes a shape for a smooth contact and separation.

18. The optical device of claim 17, wherein the shape is a hemispherical shape to transmit vibration in all axis directions.

19. The optical device of claim 16, wherein the anti-vibration device is provided with a rubber-like viscoelastic material to absorb a vibration of the tray body using a viscoelasticity attenuating action.

* * * * *